United States Patent [19]

Matthews et al.

[11] Patent Number: 5,539,212
[45] Date of Patent: * Jul. 23, 1996

[54] TOXIC REMEDIATION SYSTEM AND METHOD

[75] Inventors: Stephen M. Matthews, Alameda County; Russell G. Schonberg; David R. Fadness, both of Santa Clara County, all of Calif.

[73] Assignee: Zapit Technology, Inc., Santa Clara, Calif.

[*] Notice: The portion of the term of this patent subsequent to Jun. 7, 2011, has been disclaimed.

[21] Appl. No.: 253,967

[22] Filed: Jun. 3, 1994

Related U.S. Application Data

[63] Continuation of Ser. No. 941,788, Sep. 8, 1992, Pat. No. 5,319,211.

[51] Int. Cl.⁶ .................................................. H01J 37/30
[52] U.S. Cl. ................................. 250/492.3; 204/157.15
[58] Field of Search ...................... 250/492.3; 204/157.15

[56] References Cited

U.S. PATENT DOCUMENTS

| | | | |
|---|---|---|---|
| 2,892,946 | 6/1959 | Dewey et al. | 204/157.15 |
| 4,294,674 | 10/1981 | Aoki et al. | 204/157.1 H |
| 4,372,832 | 2/1983 | Bush | 204/157.1 R |
| 4,507,265 | 3/1985 | Higo et al. | . |
| 4,595,569 | 6/1986 | Reuter et al. | 422/186 |
| 4,596,642 | 6/1986 | Higo et al. | . |
| 4,702,808 | 10/1987 | Lemelson | 204/157.41 |
| 4,752,450 | 6/1988 | Dietrich et al. | 250/492.3 |
| 4,882,020 | 11/1989 | Maezawa et al. | 204/157.3 |
| 4,969,984 | 11/1990 | Kawamura et al. | . |
| 5,015,443 | 5/1991 | Ito et al. | . |
| 5,219,534 | 6/1993 | Reynolds | 422/186.3 |
| 5,357,291 | 10/1994 | Schonberg | 250/492.3 |

*Primary Examiner*—Bruce C. Anderson
*Attorney, Agent, or Firm*—Stanley Z. Cole

[57] ABSTRACT

What is disclosed is a novel toxic waste remediation system designed to provide on-site destruction of a wide variety of hazardous organic volatile hydrocarbons, including but not limited to halogenated and aromatic hydrocarbons in the vapor phase. This invention utilizes a detoxification plenum and radiation treatment which transforms hazardous organic compounds into non-hazardous substances.

22 Claims, 3 Drawing Sheets

TOXIC REMEDIATION SYSTEM AND METHOD

This invention is licensed to the United States Government.

This application is a continuation of application Ser. No. 07/941,788 filed Sep. 8, 1992, which issued as U.S. Pat. No. 5,319,211 on Jun. 7, 1994.

BACKGROUND

Hazardous volatile organic compounds (VOC) in soils and groundwater can pose significant health risks, particularly if aquifers which feed the water supplies of population centers are threatened. Current remediation methods for treatment of soil and groundwater include air stripping, vacuum extracting, carbon containment, incineration/oxidation and bioremediation.

Air stripping and vacuum extracting are dispersion technologies which extract vapors (the words vapors, VOCs and gases are generally used interchangeably throughout and, unless clearly understood otherwise, are intended to have the same meaning) from the soil and vent the contaminants to the atmosphere. While these techniques are relatively inexpensive and can prevent or reduce groundwater contamination threats, they are environmentally undesirable because they merely change the medium of the pollution (from soil to air). Venting is controversial and its use in the future is likely to be limited by stricter air quality regulations.

Carbon containment is a collection technology in which vapors from vapor extraction wells or other VOC sources are passed through carbon (or other adsorbent) filled canisters to adsorb the VOC's. Collection technologies prevent or limit groundwater contamination by reducing the contaminant level and can be cost effective for certain flowrates and contamination levels. However, containment is not a destruction technology; the VOCs collected require removal and subsequent disposal. Also, containment is not universally effective, as some VOCs have low adsorptivity.

Incineration involves high temperature burning of waste streams from soil or air-stripped ground water for destruction of VOCs. Incineration is highly controversial, often achieving only incomplete destruction, and is costly. Incomplete destruction can produce products more hazardous than the original contaminant and has the potential of releasing them to the atmosphere.

This current state-of-the-art has led to the present invention, which achieves safe and effective destruction on site for a wide variety of VOCs.

SUMMARY OF THE INVENTION

The present invention involves a system which may be connected to a vapor extraction system. Toxic vapor, whether extracted from soil or groundwater or from other sources, enters a detoxification plenum where a powerful electronically generated beam of electrons is injected. The electrons interact with the toxic vapor, causing chemical transformation to occur within the reaction plenum.

This chemical transformation of volatile organic chemicals through electron beam processing includes:

1. Direct de-chlorination resulting in inorganic chloride ions and reactive organic intermediates which are further degraded into non-reactive compounds.

2. Production of organic and inorganic free radicals and ions which are reactive and whose reactions result in destruction of the target hazardous materials.

3. Formation of aqueous electrons (in the presence of water vapor) capable of reducing chemical bonds.

Free radical catalysts or scavengers may be added to alter formation or rates of formation of environmentally safe reaction products.

On-line monitors (gas chromatograph, volume flow meters, pressure gauges) may be used to measure the extent of the chemical transformation or destruction; and electronic circuitry (dosimeters, current and voltage monitors) may be used to measure the operational power level of the electron beam. As a back-up, carbon collection canisters may be used as traps to adsorb any hazardous volatiles which were not completely transformed or destroyed during processing.

PRIOR ART

Although prior art references disclose the use of electron beams to reduce emissions of sulfur oxides ($SO_x$) and/or nitrogen oxides ($NO_x$) from conventional power plant facilities, systems are not described which are mobile and effective in destroying VOCs. This prior art describes how effluent gas from power plants can be diverted into a reaction chamber where it can be irradiated by electron beams before exiting the power plant as stack gas. If beam power is sufficiently high, irradiation from the electron beams can substantially reduce (though not completely eliminate) $SO_x$ and $NO_x$ emissions from the output stack. Reductions by various approaches of as much as 90% in $SO_x$ and $NO_x$ emissions are claimed.

In one approach, electron beam irradiation is used to convert $SO_x$ and $NO_x$ into mists and solid particulates which pass through dust collectors to reduce emissions. In another approach, air is introduced into the reaction chamber where irradiation by electron beams forms ozone and oxygen atoms. Irradiated air is then mixed with waste gas to oxidize the NO in the gas to form $NO_2$. The processed gas is introduced to a wet absorption tower to effect desulfurization and denitration. Another approach is to use electron beams to form active species such as O and OH radicals in the irradiated waste gas which is then fed into the main waste stream from which the SOx and $NO_x$ ingredients are removed. These disclosures are found, for example, in such patents as U.S. Pat. Nos. 4,507,265; 5,015,443; 4,596,642; and, 4,915,916. In U.S. Pat. No. 4,969,984, ammonia is added as a means of reducing $SO_x$ and $NO_x$ emissions from stack gas.

The approaches of these prior art inventors has been in processing large volume effluent flows from power plants (typically tens of thousands of cubic feet per minute (CFM)). These huge volume flows have employed several stationary electron beam accelerators, each capable of hundreds of kW of beam power. The electron generators that are described in these patents are of the DC type and have a low beam energy, typically in the 100–500 keV range.

Reaction chambers of these prior art approaches have been designed primarily as a containment vessel for effluent stack gases and as a shield for the radiation. The reaction chambers and the electron sources of these references are large and cumbersome. Additionally since the objective has been for a reduction in the release of objectionable materials, only limited concern was given to the inefficiency of the irradiation processes in these reaction chambers. Effluent flow itself is very high in these systems and is not totally addressed.

KEY FEATURES

The objectives of this invention are achieved through the use of a reaction or transformation plenum or chamber of a novel design and through the use of a powerful source of electrons and a system that enables more effective radiation of the vapors being treated. The plenum design includes unique features which optimize the transformation process so that efficiencies of at least 20% and preferably in excess of 32% are achieved. These efficiencies (percentage of electrons in the beam which strike toxic molecules with effectiveness causing chemical transformations) have been calculated by Monte Carlo calculations and have been confirmed through measurements of processed gas.

In the instant invention, the plenum is located or positioned in close proximity to an electron accelerator. Toxic vapors enter the plenum and, while inside, are chemically transformed to environmentally safe by-products by an electron beam produced by the electron linear accelerator.

The plenum's shape is designed to optimize the efficiency of electron beam interactions with the vapor being processed. When the electron beam enters the reaction plenum or chamber, it is scattered conically, first by the exit window of the electron accelerator where the electron beam is produced, and second by another window which separates the accelerator from the plenum. The angle of scatter depends on the energy of the electron beam and the thicknesses and materials of the windows. Windows scatter an electron beam according to the following formula:

$$\emptyset_o = \frac{14.1}{p\beta} (L/L_R)^{1/2} [1 + (1/9) \log_{10} (L/L_R)] \text{ (radians)} \quad \text{Equation 1}$$

where $$p\beta = \frac{T(T=2M_o)}{T+M_o}$$

where T=Kinetic Energy, $M_o$=electron mass at rest, $\rho$, $\beta$ is the momentum (n MeV/c), velocity, and $L/L_R$ is the thickness, in radiation lengths, of the scattering medium. To reduce the composite angle of scatter, the plenum window is placed as close to the accelerator electron window as is possible. Ozone generated in the space between the accelerator and plenum window is carried away by a flow of a nonreactive gas through the space between the windows.

Other objects and advantages of this invention will become more apparent to one skilled in the art from the following description taken in conjunction with the following drawings.

DRAWINGS AND BRIEF DESCRIPTION

Figure 1:
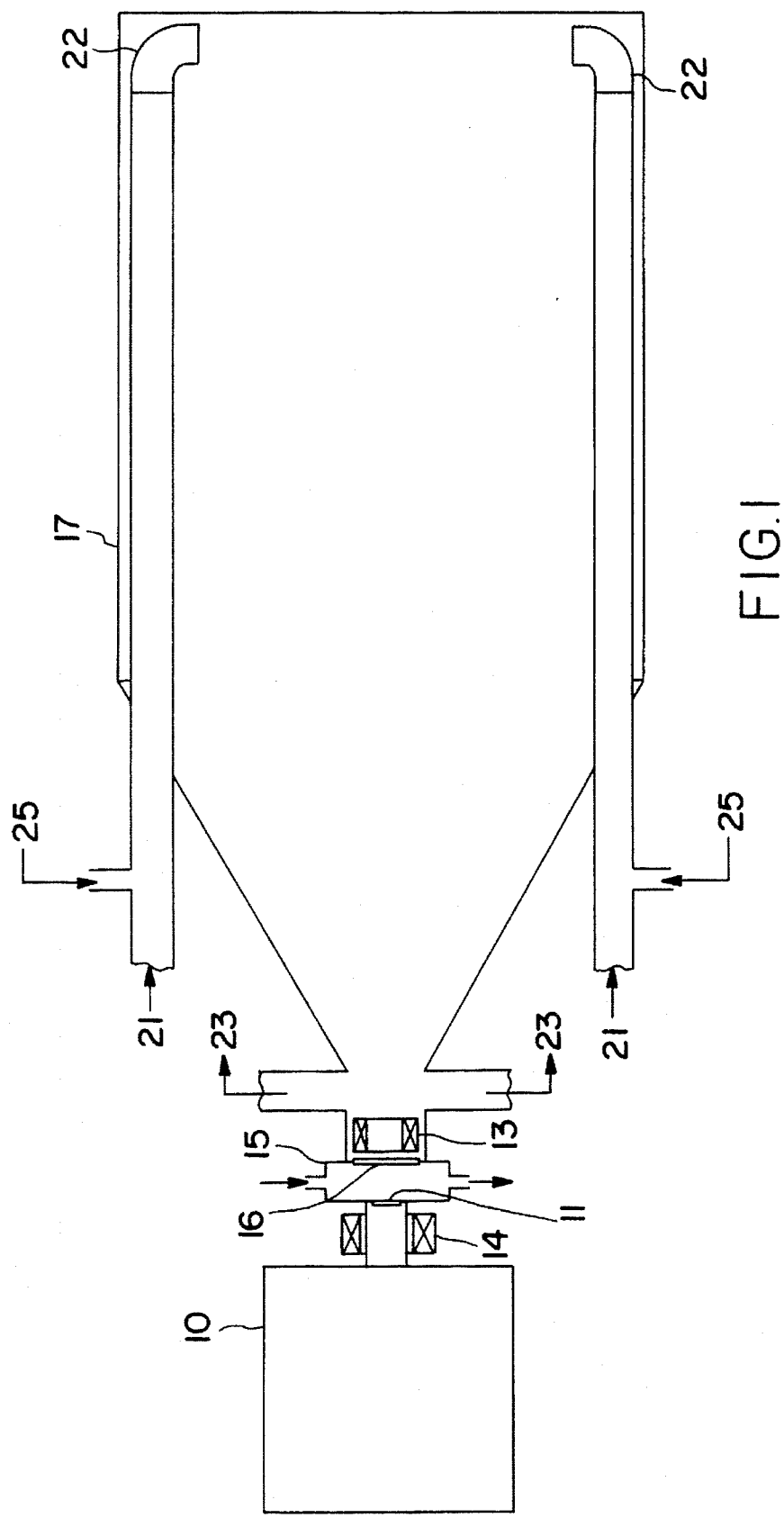
FIG. 1 is an illustrative schematic drawing of the system of this invention.

FIG. 1 shows the preferred configuration for a toxic waste remediation system in accordance with this invention. This system is designed to treat toxins in the vapor phase with high efficiency while maintaining transportability. An electron linear accelerator 10 generates an electron beam. For vapor phase toxins, energies of between 2 and 3 MeV provide a good compromise between providing adequate beam power and compactness in size of the overall treatment system. To treat vapor phase toxins, electron accelerators with beam powers of about 3 kW provide good processing throughput. Lower or higher power systems also are commercially useful and accelerators which generate energies as low as 1 MeV and up to 10 MeV may, for example, be used.

The electron beam from the accelerator travels through an electron window 11, which may typically be a thin metal scatterer. Typical electron window materials include, but are not limited to, titanium, stainless steel or beryllium, varying in thickness from 0.5 mils to several mils thickness. Other metals or even non-metals such as ceramics may also be used.

This accelerator electron window maintains a high vacuum in the accelerator and scatters the cylindrical electron beam issuing from the accelerator, at a nominal 1–3 mm diameter, to an output cone whose angle is calculated by Equation 1. Choice of material and thickness of the electron window will determine the resultant scatter angle. The goal in selecting material and thickness for the electron window is to provide a desired scatter angle and low energy loss, while still maintaining good thermal conductivity to reduce thermal stresses generated in the window by the electron beam. The window may also be water cooled.

Defocusing coils 14 may be used to enlarge the effective electron beam diameter, reducing thermal stresses on the window. The scattered electron beam passes through an enclosure 15 which is purged by a non reactive gas to eliminate ozone formed by the electron beam. The scattered electron beam exits chamber 15 through plenum window 16 where it is again scattered according to Equation 1. Since chemical processes which occur in the plenum can result in the formation of acidic vapors the plenum window is made of acid resistant material, such as silicon carbide. Plenum walls may comprise plastic or other material of low atomic number to minimize the creation of X-rays resulting from collisions with impinging electrons. This material can be covered with a shielding material such as lead and concrete to permit operation with humans in the area.

The electron beam passes into the transformation or detoxification plenum 17. The input end of the plenum is conical followed in this embodiment by a cylindrical section whose diameter is smaller than the electron beam. The optimum cone angle of the plenum for process efficiency is designed so that the scatter angle of the electron beam entering the plenum will approximately conform to the plenum cone so that most of the electron beam is directed into the plenum to interact with gases being processed.

Design of the chamber should be such that the accelerator window and plenum windows are positioned as close as practical. This results in a composite electron beam scatter angle from the two windows which is as narrow as possible. Smaller plenum cone angles may be required to meet practical constraints of size and weight, particularly for transportable systems. Also the length of the plenum should be optimized for beam energy and the density of the gas being detoxified. As with limitations on the cone angle, compromising overall length of the plenum for practical considerations of size and weight may be necessary. An overall length of about 20 feet seems to be a reasonable compromise between maximum efficiency and transportability.

As the electron beam enters the plenum, it passes through a toroid 13 which allows direct measurement of total beam current. Since accelerator energy is held constant, the beam power can thereby be measured directly.

Figure 2:
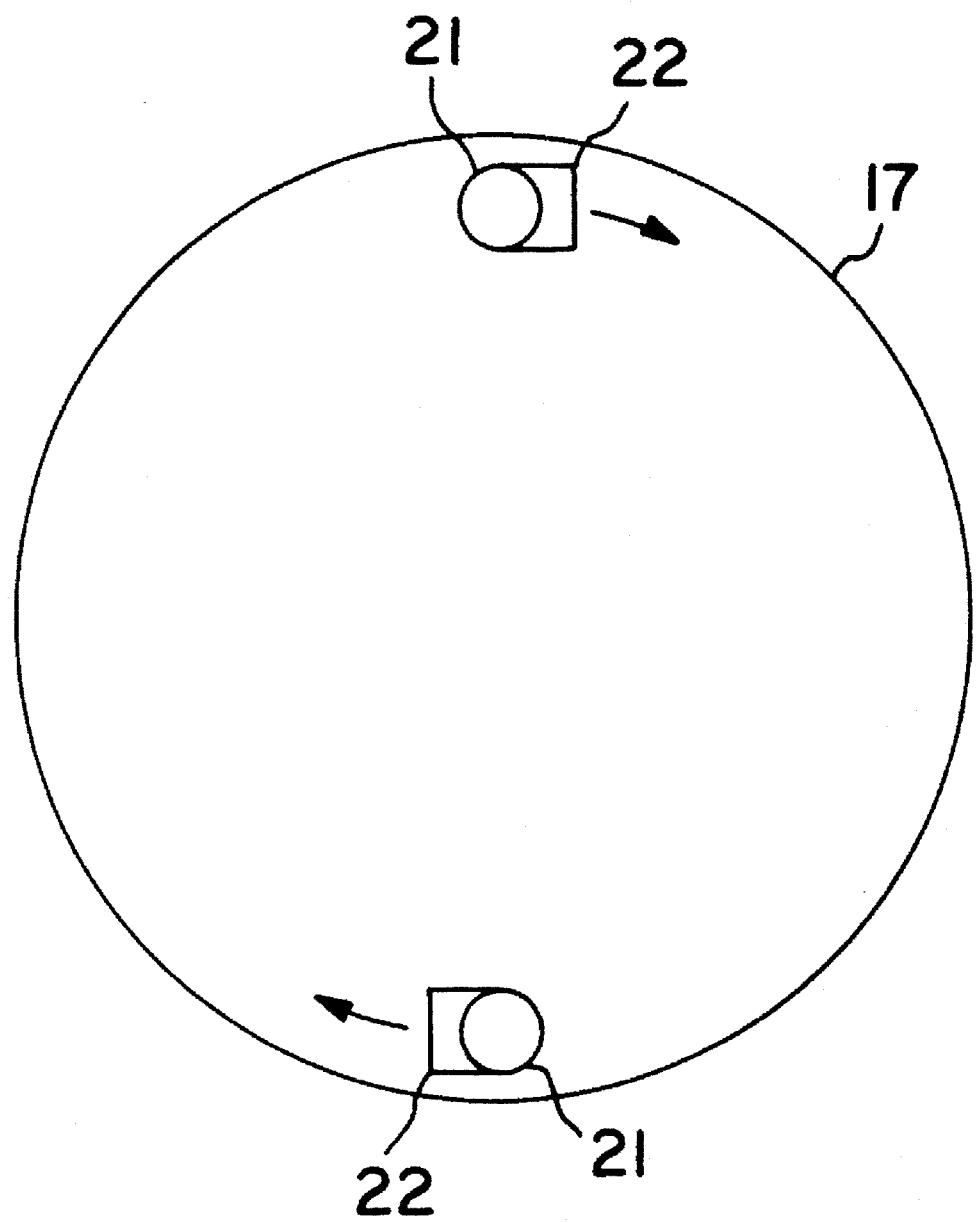
FIG. 2 is a cross sectional view of an embodiment of the input lines at the closed far end of the plenum; and, FIG. 3 is schematic drawing of another embodiment of this invention.

Toxic gases enter the plenum by means of two entry pipes 21. The pipes run down the inside, along diametrically opposite sides of the plenum to its far end. An elbow 22 at the end of each input pipe (See FIG. 2) directs incoming gas initially into a vortex flow around the far end of the plenum. However, the input pipes 21 (and if necessary additional interfering means not shown) are used to disrupt this flow pattern to create turbulence. The input could, of course, be fed from holes along the entry pipes 21. Turbulence assures a uniform dose of electrons across the gas flowing through the plenum and increases the path length VOC molecules must travel. Treated gas exits through a pair of ports 23 near the electron beam input end of the plenum. Because that end is conical and grows smaller toward the point of input for the electron beam, no gas molecules escape exposure to an increasingly intense incoming electron beam.

Ports 23, located near the point of input of the electron beam into the conical section, provide an exit for the treated gases. These lines can be connected, to a conventional scrubber system (not shown) to process any acids which may be formed during the detoxification process. Scrubbed gas may then be passed through a conventional adsorption material (such as charcoal). The adsorption material will trap any residual toxic vapors and serve as a back up system in the event that the electron beam is deactivated prematurely. However, this is not an essential element in the system of this invention. Influent and effluent gasses can be monitored on-line by instruments to determine toxicity of input and output gases. The input and output temperature of the gas and the gas flow rate may also be monitored. Additional lines 25 can be added to allow the insertion of various catalysts into the plenum to aid in the reaction process. Electrons will undergo multiple scattering processes in the chamber, including collisions with other gas molecules and from collisions with the walls of the chamber. Interactions of primary scattered electrons with the VOCs result in chemical reactions which destroy the VOCs in the gas flow.

Changing the temperature and pressure of the gas in the plenum through conventional methods will also effect the rate at which the gas is detoxified.

The shape of the plenum is designed so that the upper or entrance portion of the plenum is conical. The cone angle of the plenum is fabricated to closely match the composite scatter angle of electrons entering the plenum. That angle follows from scatter created by windows such as the accelerator window and/or the plenum window. Length of the plenum depends on the energy of the electron beam and the density of the gas being processed.

For example, the range or distance electrons can travel through air when injected at 2.5 Mev is approximately 40 feet for 100% absorption. If however, one is interested in a transportable plenum, a 20 foot long plenum is more useful. Importantly, such a plenum if constructed in an appropriate configuration can achieve 32% efficiencies. The electron energy of a 2.5 Mev beam absorbed in 20 feet, or in approximately ½ the distance for full absorption, is approximately ⅔rds of the total. With such construction, one gives up or wastes ⅓rd the electron energy which becomes unavailable to destroy toxic molecules. Of the remaining ⅔rds, approximately ½ of the electrons will be lost or wasted through scatter and absorption in the chamber walls resulting in 32% efficiency.

Absorption efficiency can be varied by careful selection of scattering windows and by optimizing energy to match the chamber length and configuration.

In the above example the energy of the beam was injected at 2.5 Mev and would thus normally be fully absorbed in 40 feet. If the beam were (for example) injected at 1 Mev, the expected distance for full absorption would be within about 14 feet. The distance for full absorption of different beams may be determined from published tables such as are found in Tables of Energy Loses and Ranges of Electrons and Positrons by Berger and Seltzer published in 1964 and issued by NASA as SP 3012.

Again, if a 1 Mev beam were used, a plenum could be designed to be about half the full absorption distance or about 7 feet. In such a case since the energy is lower, $\rho\beta$ in Equation 1 is smaller with the effect that the angle $\emptyset_o$ is increased. This means that if the conical shape of the plenum is maintained, more of the electron beam would strike the walls of the chamber and be lost and absorbed by the walls, thus creating a less efficient system. Alternatively, the angle of the conical portion of the plenum could be increased to match the determination of $\emptyset_o$ and to improve the efficiency of the system. If a larger scatter angle is matched by the conical portion of the plenum, the plenum will be able to handle a larger volume of gases to be treated and/or could constitute a mechanism to increase the dwell time of gases subject to treatment.

The shape of the chamber may also be used to control turbulence in the gas flow through the system. Desired dwell time will depend on such factors as the electron beam flux, plenum volume, the velocity with which the vapor moves through the system, the density of the vapors being treated as well as gas temperatures, and like elements. One skilled in this art, however, will be able with a reasonable level of accuracy define and select the interrelated elements to create operable systems and systems with a controlled degree of efficiency within the teaching of this disclosure.

It is noted that magnetic bending or scanning mechanisms can be incorporated at the end of the accelerator to control beam distribution which can be structured to match the plenum shape.

The plenum can be designed to be inserted vertically into a hole in the ground (see FIG. 3 below) which allows the earth surrounding the plenum to act as a radiation shield, reducing the shielding requirements in connection with the plenum. Alternatively, and as shown in FIG. 1 the plenum can be oriented horizontally so that the accelerator module, plenum and a mobile shield can be mounted on a flatbed truck. Horizontal orientation is the preferred construction since transport from site to site is readily accomplished and deep holes to hold and shield the plenum at the clean-up site can be avoided.

Detoxification chambers have generally been large systems designed for use with coal and oil burning power plants. Design of these chambers focussed on providing a self-shielded containment system for the reduction of oxides of sulfur and nitrogen. No attempts were made to increase the efficiency of the design of the chamber or to control the dwell time for the gas vapors or to make the system efficient or transportable. As a result these systems tended to be inefficient and did not destroy chemical bonds as is achieved in the instant high efficiency system.

Figure 3:
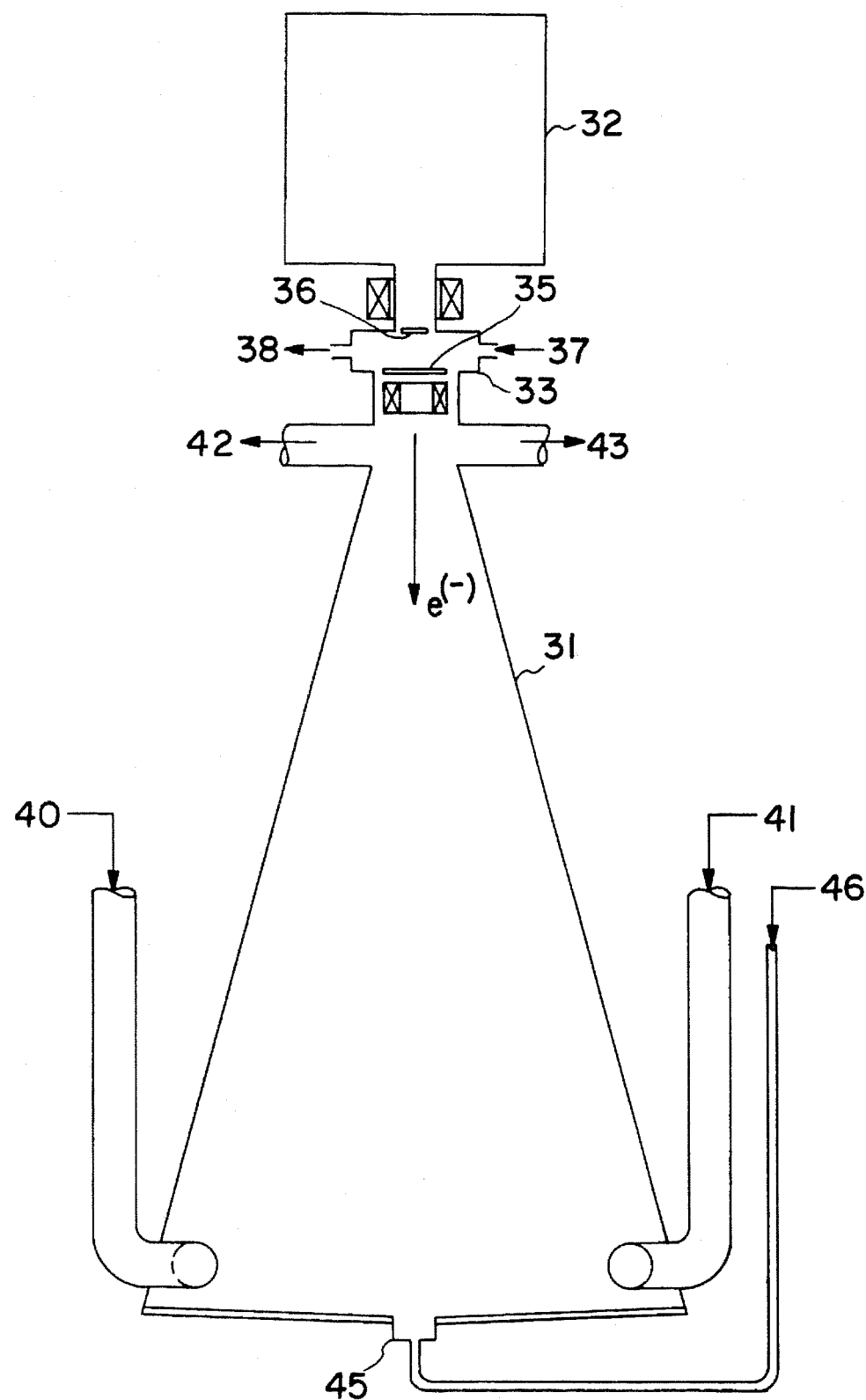

Referring now to FIG. 3, there is shown another embodiment of a system for the irradiation of vapor at atmospheric pressure. Plenum 31 which is conical for its entire length may be operated buried in the ground with its axis vertically oriented. Shielding is achieved in such case by the surrounding earth. The accelerator 32 coupled to the plenum was a 2.5 MeV electron accelerator which produced an average beam of 400 W. This system, using a plenum design like that shown in FIG. 1, was successfully employed in actual field tests to expose trichlorethylene (TCE) vapor in a humid air stream to an electron dose of up to 500 kR. Excellent efficiency in destroying toxicity were reliably demonstrated. Good results, however, have also been obtained with electron doses as low as 90 kR The plenum design is a gas tight conical reinforced structure which attaches to the accelerator at the mating collar 33 at the top of the plenum to align it with the plenum axis. Electrons enter the plenum through a window 35 which also diffuses the beam and seals the narrow end of plenum 31. Window 35 scatters the electron beam into a solid conical angle such that the entire volume of the plenum is irradiated. In this embodiment the window 35 is a stainless steel foil several mils thick backed by a plastic layer scatterer also several mils thick. Both the accelerator output window 36 and the window 35 on the plenum are cooled by a nitrogen gas flow through the nitrogen inlet 37 and nitrogen outlet 38. The plenum in this instance was 20 feet high.

VOCs enter the plenum through the vapor inputs 40 and 41 at the base. The vapor next passes through the plenum where it is exposed to an electron beam as it moves toward the vapor outlets 42 and 43 at the top of plenum 31. In this case a sump 45 at the base collects liquid condensate arising from the vapor's humidity. Liquid collected by the sump may then be sampled through sampling tube 46.

In actual operation, this system was able to successfully process TCE vapor pumped from the ground at the rate of 270 CFM. Input gases contained impurities measured at 60 ppm. Following processing, the exiting gases were again measured and found to have less than 0.1 ppm of impurities, which is the limit of detectability of the equipment that was available.

While this invention has been described in terms of specific embodiments and operations, it should be understood that this description was for purposes of illustration only and that the present invention is capable of modifications and variations in light of the above disclosures and teachings. It is therefore to be understood that the invention may be practiced in ways other than the specific descriptions and embodiments set forth herein and that it is intended to cover broadly the invention as set forth in the appended claims.

What is claimed is:

1. A vapor treatment system comprising an electron generator to output energetic electrons, a reaction chamber to transform organic compounds into environmentally more acceptable chemicals, means to flow vapors for treatment into said reaction chamber, an electron window positioned across the output end of said electron generator and adjacent to said reaction chamber, said electron window permitting passage therethrough of electrons directed toward said reaction chamber from said electron generator to interact with vapors in said reaction chamber, said window having at least an acid resistant surface facing toward said reaction chamber, and means to flow an effluent from said reaction chamber.

2. A vapor treatment system comprising an electron generator to output energetic electrons, a reaction chamber in which organic compounds are transformed into environmentally more acceptable chemicals, means to feed vapors for treatment into said reaction chamber, an electron window positioned across the output end of said electron generator and adjacent to said reaction chamber, said electron window permitting passage therethrough of electrons directed toward said reaction chamber from said electron generator to interact with said vapors in said reaction chamber, said chamber having at least an internal surface of a material of a low atomic number, and means to flow an effluent from said reaction chamber.

3. A vapor treatment system in accordance with claim 1 including means to monitor the beam current in the vicinity of the entry to said reaction chamber.

4. A vapor treatment system in accordance with claim 2 in which said internal surface of said chamber having a low atomic number comprises a plastic liner for said reaction chamber.

5. A treatment system comprising an electron generating source for energetic electrons, a reaction chamber, means to feed vapors including organics in gaseous form to said reaction chamber for treatment therein, an electron window associated with said generating source, means to direct energetic electrons from said source through said window and into said reaction chamber, said electrons and said vapors interacting within said chamber to effect chemical transformations therein, said window having at least an acid resistant surface facing toward said reaction chamber, and means to flow an effluent from said reaction chamber.

6. A treatment system in accordance with claim 5 having two windows, one of which is positioned in the area of the output end of said electron source and the other of which is positioned in the entry area of electrons into said reaction chamber.

7. A method of transforming environmentally objectionable organic compounds in an influent gaseous flow into environmentally more acceptable chemicals comprising generating electrons, interacting said influent flow including volatile organic compounds with said electrons producing chemical intermediates, and continuing interactions of electrons from said electron beam with said intermediates to transform said intermediates.

8. A method of transforming environmentally objectionable compounds in accordance with claim 7 in which the interaction of electrons with said gaseous flow produces reactive chemicals, and which with said continuing interactions destroys target hazardous material.

9. A method of transforming environmentally objectionable organic compounds in accordance with claim 7 in which the interaction of said electrons with said influent gaseous flow occurs in the presence of water vapor.

10. A method of transforming environmentally objectionable organic compounds in an influent gaseous flow including chlorinated compounds into environmentally more acceptable chemicals comprising generating electrons, interacting said influent flow with said electrons and in which the interaction of electrons with said influent produces chloride ions and reactive intermediates and in which continuing said interactions between treated-influent and said electrons transform said treated-influent into said environmentally more acceptable chemicals.

11. The method of transforming organic compounds into environmentally more acceptable elements and compounds comprising creating an influent gaseous flow including said organic compounds, flowing said influent flow into an enclosure, generating an electron beam, directing said electron beam into said enclosure causing said electrons from said beam to interact therein with said influent flow, and flowing said flow as a gaseous effluent flow from said enclosure following interactions therein with said electrons.

12. A method of transforming organic compounds in accordance with claim 11 including creating turbulent flow of said influent in said enclosure during interaction with said electrons.

13. A method of transforming organic compounds in accordance with claim 11 including adding a catalyst to said enclosure to enhance interactions therein between said influent and said electrons

14. A method of transforming organic compounds in accordance with claim 11 including adding a scavenger to said enclosure to enhance interactions therein between said influent and said electrons

15. A method of transforming organic compounds in accordance with claim 11 including monitoring beam currents entering said enclosure and providing currents as desired therein.

16. A method of transforming volatile organic compounds in accordance with claim 11 including controlling the temperature of the gaseous flow within said enclosure.

17. A method of transforming volatile organic compounds in accordance with claim 11 including controlling the pressure within said enclosure.

18. A method of transforming environmentally objectionable volatile organic compounds in accordance with claim 11 including flowing said effluent to and through an adsorbing material for volatile organic compounds to assure removal of any remaining said compounds in said effluent gaseous flow as it passes therethrough.

19. A method of transforming organic compounds into environmentally more acceptable elements and compounds comprising creating an influent gaseous flow including said organic compounds, flowing said influent flow into an enclosure, generating an electron beam, directing said electron beam into said enclosure causing said electrons from said beam to interact therein with said influent flow, flowing said flow as a gaseous effluent flow from said enclosure following interactions therein with said electrons for further processing of said effluent and dissipating residual energy of said electrons while minimizing xray generation through the use of a surface material of a low atomic number as the internal surface of said enclosure.

20. The method of transforming hazardous hydrocarbons into environmentally more acceptable chemicals comprising creating an influent flow including said hydrocarbons, flowing said influent flow into an enclosure, generating an electron beam, directing said electron beam into said enclosure to cause said electrons from said beam to interact therein with said influent flow, and flowing said flow as an effluent flow from said enclosure following interactions therein with said electrons.

21. An electron beam system for the conversion of volatile organic compounds comprising:

an electron beam source;

a reaction chamber; for treating volatile organic compounds an electron permeable window at the output of said electron beam source; and, means to distribute the beam power of said electron beam over substantially the area of the window minimizing thermal stresses of said window caused by said beam.

22. A treatment system comprising an electron generating source for energetic electrons, a reaction chamber, means to feed vapors including organic compounds in gaseous form to said reaction chamber for treatment therein, an electron window associated with said generating source, said electron generating source being positioned to direct energetic electrons from said source through said window and into said reaction chamber, said electrons and said vapors interacting within said chamber to effect chemical transformation therein, said window having a protective surface facing toward said reaction chamber, and means to flow an effluent from said reaction chamber.

* * * * *